March 21, 1967  J. F. TAPLIN  3,309,967
ROLLING DIAPHRAGM DEVICES HAVING LOOSE COUPLING BETWEEN PISTON
AND PISTON ROD TO RENDER THE PISTON FLOATING
Filed Jan. 25, 1965
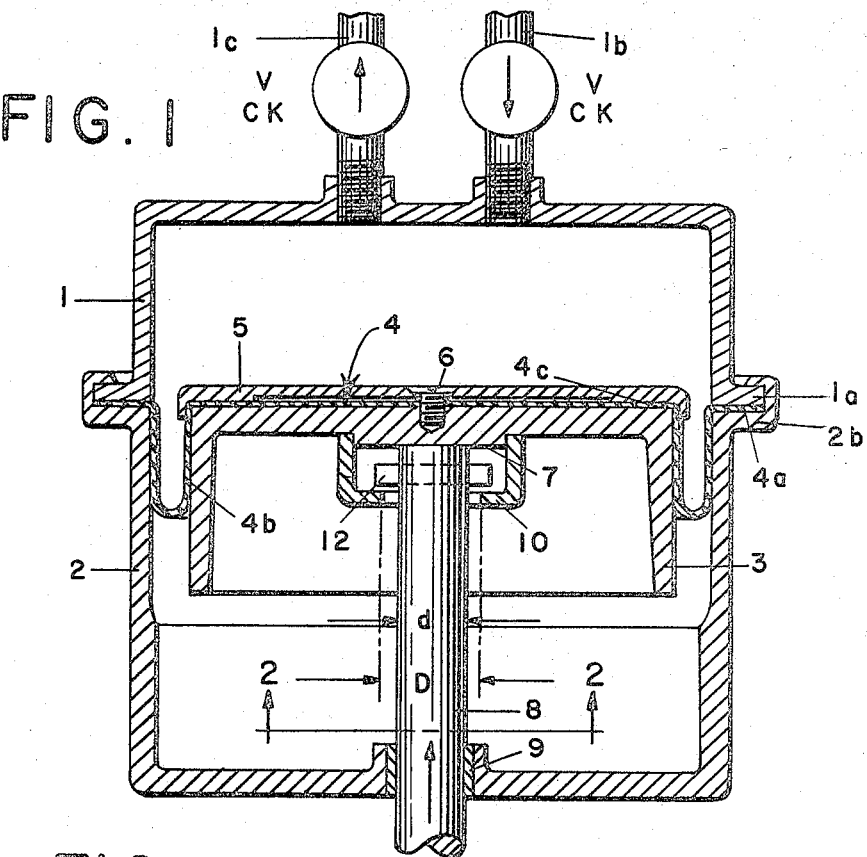
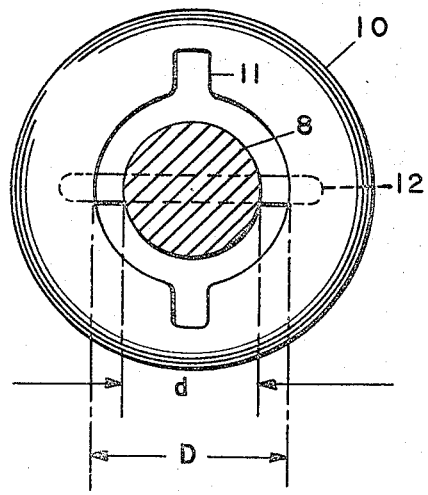
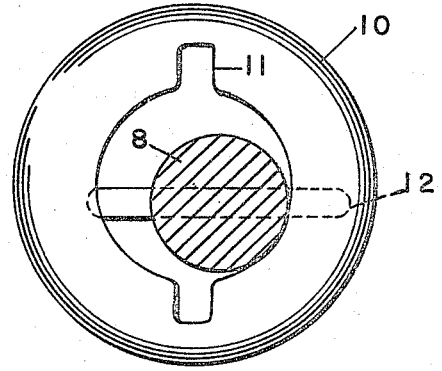
INVENTOR.
BY John F. Taplin

United States Patent Office 3,309,967
Patented Mar. 21, 1967

3,309,967
ROLLING DIAPHRAGM DEVICES HAVING LOOSE COUPLING BETWEEN PISTON AND PISTON ROD TO RENDER THE PISTON FLOATING
John F. Taplin, 15 Sewall St.,
West Newton, Mass. 02165
Filed Jan. 25, 1965, Ser. No. 427,846
2 Claims. (Cl. 92—101)

This invention is concerned with, and relates to, rolling diaphragm devices.

Rolling diaphragm devices comprise a cylinder body, a piston reciprocable inside of the cylinder body and a rolling diaphragm having a radially outer flange clamped to said cylinder body, a radially inner flange clamped to said piston, and a rolling wall intermediate said radially outer flange and said radially inner flange forming a convolution arranged in a gap bounded by the lateral walls of said cylinder body and of said piston. Rolling diaphragm devices may be used as pumps, brakes, actuators and positioners, shock and vibration absorbers, etc.

It is a general object of this invention to provide improved rolling diaphragm devices.

The pistons of rolling diaphragm devices are provided with piston rods which are slidable in bearings forming an integral part of the cylinder bodies of the rolling diaphragm devices. The piston rods are generally fixedly attached to the pistons and are supposed to slide in axial direction in their bearings without effecting any motions relative to the pistons to which they are attached. If there is, in such a rolling diaphragm device, but a slight misalignment between the piston rods and the pistons, the piston rods transmit transverse forces to the pistons which, in turn, displace the pistons transversely inside of the bore of the cylinder bodies wherein the pistons are reciprocating. This results in a deformation of the rolling diaphragms, and in more or less serious malfunctioning of the rolling diaphragm devices.

It is, therefore, one object of this invention to provide rolling diaphragm devices which are not subject to the aforementioned limitations and/or drawbacks.

Another related object of this invention is to provide rolling diaphragm devices having pistons which are supported by, and freely float on, their rolling diaphragm, thus avoiding distortions of the rolling diaphragm by transverse force components.

When there is a misalignment in rolling diaphragm devices of the points of the piston rods sliding in slide bearings and the ends of the piston rods adjacent, and secured to, the pistons, as may be the result of wear of the bearings, or caused by other reasons, the forces transmitted from the piston rods to the pistons include, in addition to their preponderant component which is axial, a more or less pronounced transverse component which displaces the pistons transversely inside of their bores and distorts the rolling diaphragms which are clamped to the pistons.

It is, therefore, another object of this invention to provide rolling diaphragm devices wherein a misalignment of the ends of the piston rods adjacent the piston and the slide bearings for the piston rods does not result in malfunctioning of the rolling diaphragm devices, and a distortion of the rolling diaphragm thereof.

Further objects and advantages of the invention will become apparent as the following description proceeds, and the features of novelty which characterize the invention will be pointed out with particularity in the claims annexed to, and forming part of, this specification.

For a better understanding of the invention reference may be had to the accompanying drawings in which FIG. 1 is substantially a vertical section of a piston pump embodying the present invention;

FIG. 2 is a transverse section along 2—2 of FIG. 1 showing the structure of FIG. 1 on a larger scale; and FIG. 3 is the same view as that of FIG. 2 showing the constituent parts of the structure in a condition of misalignment.

Referring now to the drawings, and more particularly to FIGS. 1 and 2 thereof, numeral 1 has been applied to indicate the upper portion and numeral 2 to indicate the lower portion of a cylinder body. The upper portion 1 of cylinder body 1, 2 is provided with an intake duct 1b including an intake check valve and an exhaust duct 1c including an exhaust check valve. Bot' complementary portions of cylinder body 1, 2 are provided with cooperating flanges 1a, 2b and the flange 2b of part 2 forms a swaged lip overlapping flange 1a on part 1. The cylindrical space or bore defined by cylinder body 1, 2 accommodates the reciprocating piston 3 having an outer diameter which is significantly less than the inner diameter of cylinder body 1, 2. Reference numeral 4 has been applied to generally indicate a rolling diaphragm. The latter includes a radially outer flange portion 4a clamped between the flanges 1a, 2b of cylinder body 1, 2, the convoluted rolling wall 4b arranged in the cylindrical gap formed between cylinder body 1, 2 and piston 3, and the radially inner flange 4c clamped to the end surface of piston 3 by means of retainer plate 5 and screw 6. The latter projects transversely through retainer plate 5 into piston 3. Piston 3 is provided with a circular boss 7 which is externally screw-threaded and supports the internally screw-threaded cap member 10. Cap member 10 has a front plate having a central bore whose diameter has been indicated by the letter D. Piston rod 8 is circular in cross-section and its diameter $d<D$. Piston rod 8 is slidable in slide bearing 9 and projects with the end thereof remote from bearing 9 through the aforementioned bore in cap 10 into a space bounded by cap 10. As shown in FIG. 2 the central bore in cap 10 forms two elongated radial extensions 11. Pin 12 projects transversely through the upper end of piston rod 8 and is press-fitted into the latter. The extensions 11 are a means to insert piston rod 8 with transverse pin 12 thereon into cap member 10. To this end piston rod 8 is arranged in such a way that pin 12 is in registry with the slots 11 extending the bore in the front plate of cap 10 and being longer than pin 12, and upon insertion of pin 12 into cap 10 piston rod 8 is turned 90 degrees, or angularly displaced, to the position shown in FIG. 2.

In FIG. 1 piston 3 is shown in the neutral plane position which is midway between its upstroke position and its downstroke position. In the neutral plane position the flat end surface of piston rod 8 rests against the flat parallel surface of boss 7. If piston rod 8 is moved upward, an axial force is transmitted from the end surface of piston rod 8 to boss 7. This causes fluid contained in the pump chamber, i.e. the portion of cylinder body 1, 2 situated above rolling diaphragm 4, to be exhausted through passage 1c including an exhaust check valve. As piston 3 is moved upward the rolling wall 4b of diaphragm 4 rolls off portion 2 of cylinder body 1, 2 onto the lateral wall of piston 3. The downstroke or suction stroke of piston 3 is effected when piston rod 8 is moved downward. As a result, the end surface of piston rod 8 parts from the juxtaposed surface of boss 7 and pin 12 engages the front surface of cap 10, thus transmitting a downpull upon piston 3. As piston 3 performs its downstroke under the action of piston rod 8, fluid is sucked into cylinder body 1, 2 through the intake check valve provided in intake duct 1b. During the downstroke of piston 3 the rolling wall 4b of rolling diaphragm 4 rolls off the lateral wall of piston 3 onto the lateral wall of cylinder body portion 2.

It will be apparent from the foregoing that the structure of FIGS. 1 and 2 is predicated on a push-pull action of piston rod 8, and the cap 10 and pin 12 form a lost motion connection between piston 3 and piston rod 8.

Since the opening in cap 10 for the passage of piston rod 8 is larger than the cross-sectional area of piston rod 8, the latter is free to move in any direction inside the front aperture in cap 10. This limited freedom of radial motion of the upper end of piston rod 8 precludes the latter from transmitting any transverse forces upon piston 3, and hence upon rolling diaphragm 4, in case that the upper end of the piston rod 8 and the point thereof guided in slide bearing 9 should be out of alignment. The difference in diameter of piston rod 8 of the opening in cap 10 is sufficiently large to take care of the maximum misalignment which may be encountered. FIG. 3—in order to emphasize the action of the structure of FIGS. 1 and 2—shows the piston rod 8 misaligned to such an extent as to touch the rim of the opening in the front plate of cap 10.

It will be understood that although but one embodiment of the invention has been shown and described, the invention is not limited thereto, and that the illustrated embodiment may be modified, or other embodiments made, without departing from the spirit and scope of the accompanying claims.

I claim as my invention:
1. A rolling diaphragm device precluding damage to the rolling diaphragm resulting from a misalignment of the piston and of the piston rod of the device, said rolling diaphragm device including
   (a) a cylinder body having an internal cylindrical wall;
   (b) a reciprocating piston arranged inside of said cylinder body and defining a gap between the lateral wall thereof and said cylindrical wall of said cylinder body;
   (c) a rolling diaphragm having a radially outer flange clamped to said cylinder body, a radially inner flange clamped to said piston, and a rolling wall intermediate said radially outer flange and said radially inner flange forming a convolution situated inside said gap;
   (d) a piston rod for operating said piston, said piston rod having a circular cross-section of predetermined diameter;
   (e) a slide-bearing for said piston rod integral with said cylinder body;
   (f) a plate member arranged inside said piston at right angles to the axis thereof and forming an integral part thereof, said plate member having a circular aperture coaxial to said piston and having a larger diameter than said piston rod, said piston rod projecting through said aperture leaving a substantial radial clearance between said piston rod and said aperture in said plate member allowing the end of said piston rod adjacent said piston to move radially relative to said piston within the limits of said aperture; and
   (g) abutment means on said piston rod cooperating with said plate member and projecting transversely across the portion of said piston rod situated between the end of said piston rod adjacent said piston and said circular aperture in said plate member, whereby said plate member allows movement of said abutment means relative to said piston in a direction longitudinally of said piston rod within limits defined by said piston and said circular aperture in said plate member.

2. A rolling diaphragm device precluding damage to the rolling diaphragm resulting from a misalignment of the piston and of the piston rod of the device, said rolling diaphragm device including:
   (a) a cylinder body having an internal cylindrical wall;
   (b) a reciprocating piston arranged inside of said cylinder body and defining a gap between the lateral wall thereof and said cylindrical wall of said cylinder body, said piston having a cylindrical internal boss screw-threaded on the lateral side thereof and having an abutment surface at right angles to the axis of said piston;
   (c) a rolling diaphragm having a radially outer flange clamped to said cylinder body, a radially inner flange clamped to said piston and a rolling wall intermediate said radially outer flange and said radially inner flange forming a convolution situated inside said gap;
   (d) a piston rod for operating said piston, said piston rod having a flat abutment surface parallel to and cooperating with said abutment surface of said boss of said piston, said piston further having a circular cross-section of predetermined diameter;
   (e) a slide bearing for said piston rod integral with said cylinder body;
   (f) a pin having a predetermined length and projecting transversely through the end of said piston rod adjacent said piston; and
   (g) an internally screw-threaded cap screwed to said boss of said piston and housing said pin, said cap allowing movement of said pin relative to said piston in a direction longitudinally of said piston rod within limits defined by said boss and by the end surface of said cap remote from said boss, said end surface of said cap having a circular aperture coaxial to said piston, said circular aperture having a larger diameter than said piston rod establishing a substantial clearance between said aperture and said piston rod allowing the abutment surface of said piston rod to move radially relative to said piston within limits defined by said aperture.

References Cited by the Examiner

UNITED STATES PATENTS

| 9,107 | 7/1852 | Ware | 92—101 X |
| 2,170,574 | 8/1935 | Sauzedde | 92—99 |
| 3,200,717 | 8/1965 | Einsiedler | 92—94 |
| 3,208,394 | 9/1966 | Taplin | 103—150 |

FOREIGN PATENTS

| 73,747 | 1/1952 | Denmark. |
| 289,562 | 5/1928 | Great Britain. |

MARTIN P. SCHWADRON, *Primary Examiner.*

I. C. COHEN, *Assistant Examiner.*

UNITED STATES PATENT OFFICE
CERTIFICATE OF CORRECTION

Patent No. 3,309,967                                    March 21, 1967

John F. Taplin

It is hereby certified that error appears in the above numbered patent requiring correction and that the said Letters Patent should read as corrected below.

Column 2, line 14, for "Bot" read -- Both --; column 3, line 18, for "of", second occurrence, read -- and of --; column 4, line 29, for "piston", second occurrence, read -- piston rod --.

Signed and sealed this 7th day of November 1967.

(SEAL)

Attest:

Edward M. Fletcher, Jr.

Attesting Officer

EDWARD J. BRENNER

Commissioner of Patents